United States Patent [19]

Lande et al.

[11] Patent Number: 4,651,366

[45] Date of Patent: Mar. 24, 1987

[54] COMBINATION INFANT BED AND TODDLER SEAT FOR SHOPPING CARTS

[76] Inventors: Ellen B. Lande, 44 Forest St., Lexington, Mass. 02173; Deborah Silke, 20 - 40 Rugg Rd., Allston, Mass. 02134

[21] Appl. No.: 672,934

[22] Filed: Nov. 19, 1984

[51] Int. Cl.⁴ .............................................. A47C 29/00
[52] U.S. Cl. ...................... 5/98 R; 5/98 B; 5/94; 5/118
[58] Field of Search .................. 5/94, 98 R, 98 B, 118, 5/120, 122, 437, 101; 248/345.1; 280/33.99 B, 47.35; 297/273, 274, 277, 278, 219

[56] References Cited

U.S. PATENT DOCUMENTS

| | | | |
|---|---|---|---|
| 68,927 | 9/1867 | Woods | 5/98 B |
| 982,376 | 1/1911 | Macfarlane | 5/98 B |
| 1,277,781 | 9/1918 | Trammell | 5/94 |
| 1,328,832 | 1/1920 | Hanrath | 5/98 B |
| 1,462,897 | 7/1923 | Barto | 5/98 B |
| 1,569,045 | 1/1926 | Sommer | 5/122 |
| 2,487,890 | 4/1949 | Harvey | 5/98 R |
| 2,694,208 | 11/1954 | Christensen | 5/122 |
| 3,299,451 | 1/1967 | Trogdon | 5/437 |
| 3,884,495 | 5/1975 | Petock | 248/345.1 |
| 4,242,767 | 1/1981 | McMullan | 5/434 |
| 4,416,462 | 11/1983 | Thompson | 280/33.99 B |
| 4,426,113 | 1/1984 | Schutz | 5/101 |

Primary Examiner—Gary L. Smith
Assistant Examiner—Michael F. Trettel
Attorney, Agent, or Firm—William Nitkin

[57] ABSTRACT

An infant bed and toddler seat convertible apparatus for use in the seat area of shopping carts made of a cradle-shaped member attached at its ends to the sides of the cart for receipt of an infant when in its bed mode and which in its seat mode has a portion thereof folded behind another portion of the apparatus with the ends being maneuvered forward for attachment to portions of the shopping cart thereby forming a seat for a toddler.

28 Claims, 11 Drawing Figures

COMBINATION INFANT BED AND TODDLER SEAT FOR SHOPPING CARTS

BACKGROUND OF THE INVENTION

1. Field of the Invention

The apparatus of this invention resides in the area of infant carrying devices and more particularly relates to a convertible bed/seat for use in the child-seating area of a shopping cart.

2. Description of the Prior Art

Many shopping carts provide a set member which is formed by an upright back member pivoting forward and an attached seat member then falling into a horizontal position in front of the carriage handle which area can be used to carry a child. When a toddler sits on the seat, his legs pass through openings in the rear of the carriage facing the pusher of the carriage. While the seating arrangement in current shopping carts may be somewhat suitable in general for toddlers, it is unsuitable and unsafe for infants in its present configuration. When one wishes to carry an infant, one cannot merely lay an infant onto such seat area due to the hard seat and metal surrounding the area of the seat and further due to the leg openings in the rear of the carriage through which an infant might fall or be caught in it. Many young toddlers are too small to support themselves adequately in the carriage seat and must be propped up with blankets or be carried by their mothers. Older toddlers may move around, fall or otherwise injure themselves.

SUMMARY OF THE INVENTION

It is an object of this invention to provide an infant bed and toddler seat combination apparatus which can be used in shopping carts and which can be converted from an infant bed to a toddler seat as the child grows in size.

It is a further object of this invention to provide such infant bed and toddler seat for shopping carts in an easily portable form which is structured for quick and easy set-up and which will be securely held within the seat area of a shopping car and which, as the infant grows, can be converted by manipulation of the parts in a simple and easy fashion to form a seat which surrounds and supports the toddler and straps him securely and safely in position within the seat area of the shopping cart.

It is a further object of this invention to provide such apparatus in a soft form which is comfortable for the infant to be in and surrounded by and which is of an easily-cleaned fabric material.

This apparatus for retaining an infant or toddler within a shopping cart seat comprises a cradle-like substantially oblong concave bed member of soft yieldable material into which the baby is positioned lying with its head and feet at the narrower ends of the apparatus with means for attachment of such ends to the shopping cart. The cradle-shaped apparatus of this invention is adapted to have an upper portion along one of the longer lengths of the oblong folded behind the remaining portion of the bed with the ends then being brought forward with means to attach the ends to a portion of the shopping cart thereby forming a seat. Means to attach the rear of the seat to the back of the carriage seat can be provided.

DESCRIPTION OF THE PREFERRED EMBODIMENT(S)

Figure 1:
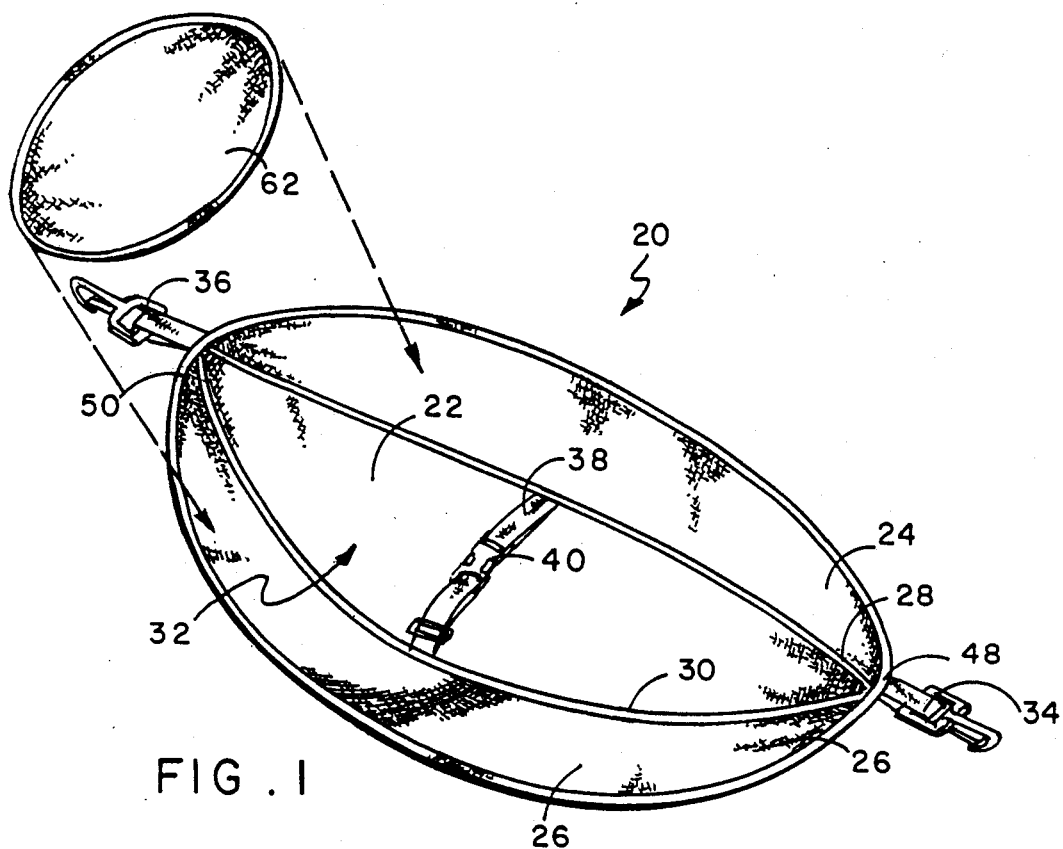
FIG. 1 illustrates a perspective view of the apparatus of this invention when used as an infant bed.
Figure 2:
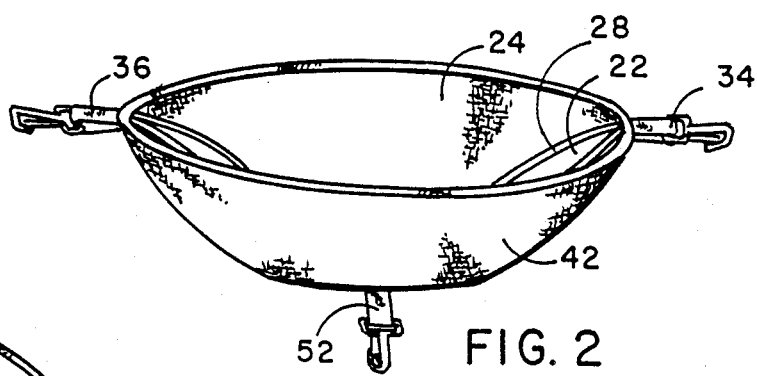
FIG. 2 is a side view of the apparatus shown in FIG. 1.
Figure 3:
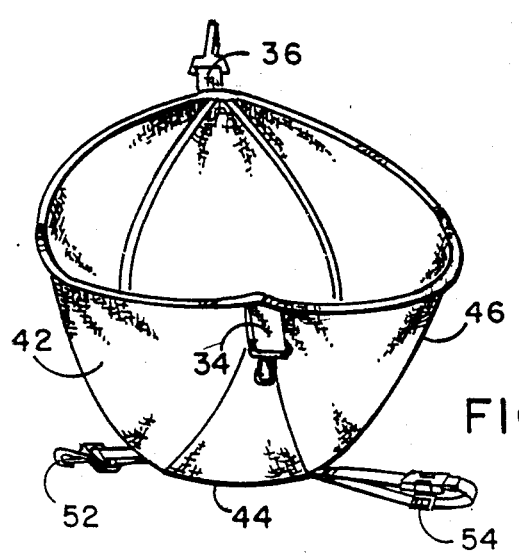
FIG. 3 is an end view of the apparatus shown in FIG. 1.
Figure 6:
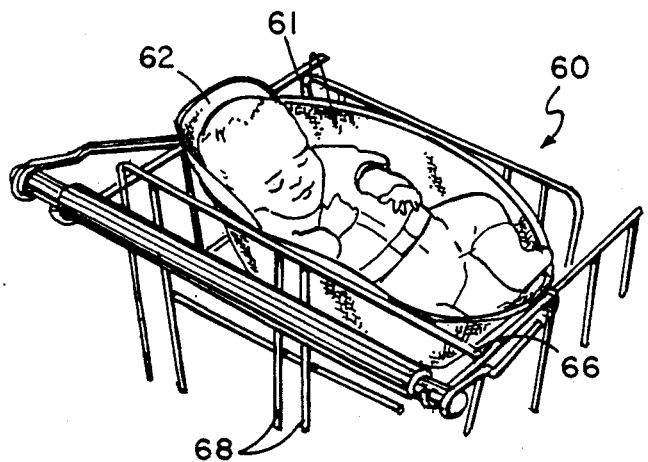
FIG. 6 illustrates the apparatus of this invention formed as a bed in place within a shopping cart with infant resting therein.
Figure 11:
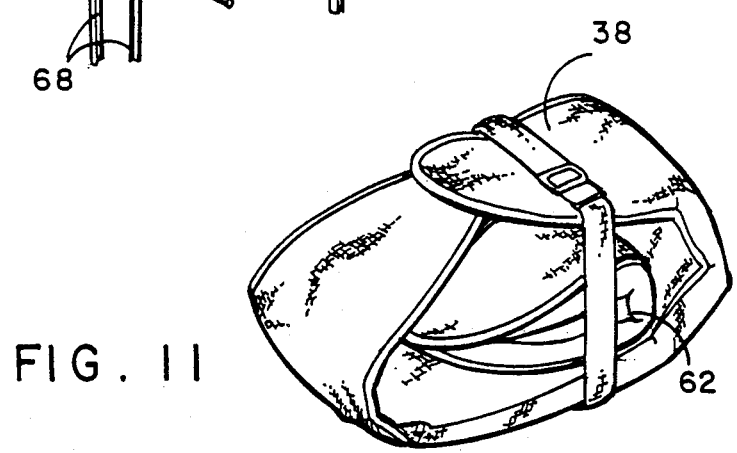
FIG. 11 illustrates the apparatus of this invention folded in its storage mode.

FIG. 1 illustrates a perspective view of the apparatus of this invention when opened from its folded storage mode as illustrated in FIG. 11 and unfolded and formed so that it can be utilized as an infant bed when inserted within the child-seating area of a shopping cart. The apparatus is formed into an oblong concave creating a cradle shape. Seen in FIG. 1 is central panel 22 which is adapted to rest on the bottom of the cart seat with first side panel 24 and second side panel 26 attached to central panel 22 and extending upwardly therefrom forming the cradle-like shape. FIG. 6 shows an infant being carried therein within the seat area of a shopping cart. Each of the three panels forming the apparatus of this invention is elliptical in shape and has substantially pointed ends, but the apparatus could be formed of a single molded piece or pieces of other shapes. The two side panels 24 and 26 are affixed one on each side of central panel 22 with the substantially pointed ends of the panels forming a narrower first bed end 48 and second bed end 50. The material of the bed can be of a soft cushioned fabric or equivalent material which possesses sufficient stiffness to retain its shape yet be resilient and yielding when pushed against or folded. The bed so formed is attached at first bed end 48 by first end hook 34 to first cart side 70 as seen in FIG. 6 and at second bed end 50 by second end hook 36 to second cart side 72 opposite first cart side 70 not seen in this view as it is behind the child's head to hold the bed securely in place within cart seat 61. A pillow member 62 can be inserted and placed at one end to support the child's head. This pillow member will be describd in further detail below as it has multi functions but is seen in the pillow mode in FIG. 6 under the child's head. Panels 22, 24 and 26 can be sewn together face-to-face with the attached edges both protruding inward or they can be otherwise affixed or formed and, in the embodiment shown, the seam ribs formed by the joining of the panels can be located, in the bed embodiment of this invention, on the inside of the bed covered by first inside binding 28 at the junction of first side panel 24 to central panel 22 and by second inside binding 30 at the junction of second side panel 26 to central panel 22. The arrangement of the material in these seams places an outward stress on the sides helping them to stay open and retain the cradle shape of the apparatus. In a central portion coming from first inside binding 28 and second inside binding 30 can extend, respectively, the first and second ends of first waist retainer strap 38 which has buckle 40 to join the two ends together. Strap 38 can be wrapped around the infant to hold him securely in the bed and is adjustable. Buckle 40 such as a Fastex brand or equivalent buckle can be of a quick-release type such as one which is squeezed at its sides to cause release of the straps first and second ends.

Figure 4:
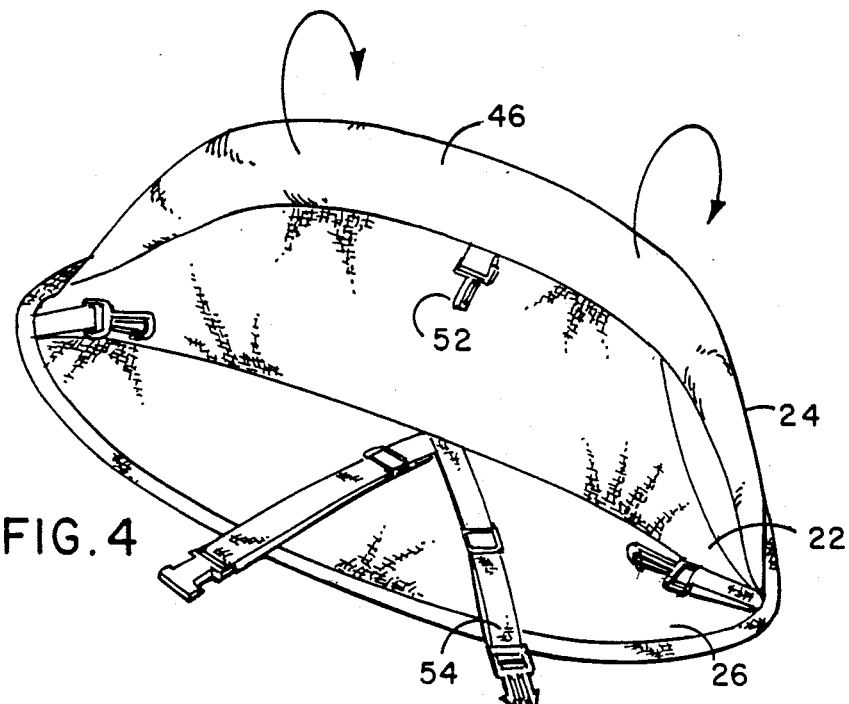
FIG. 4 is a view of the bed with a portion being folded back in order to form the seat member.
Figure 5:
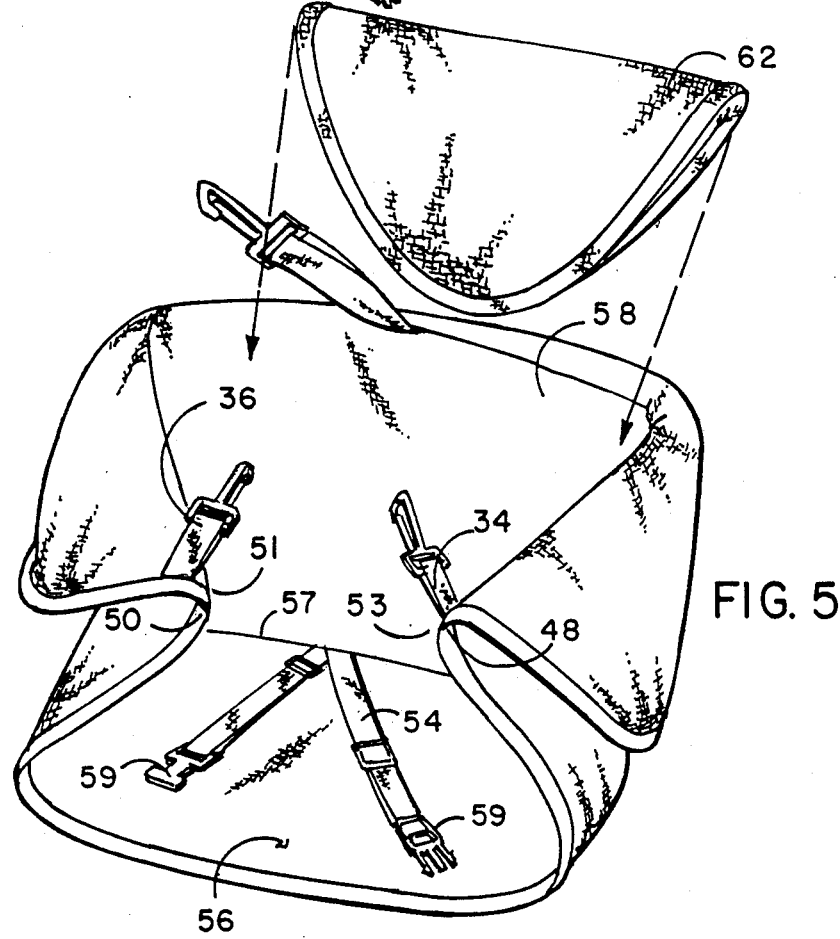
FIG. 5 illustrates a formed seat member.
Figure 7:
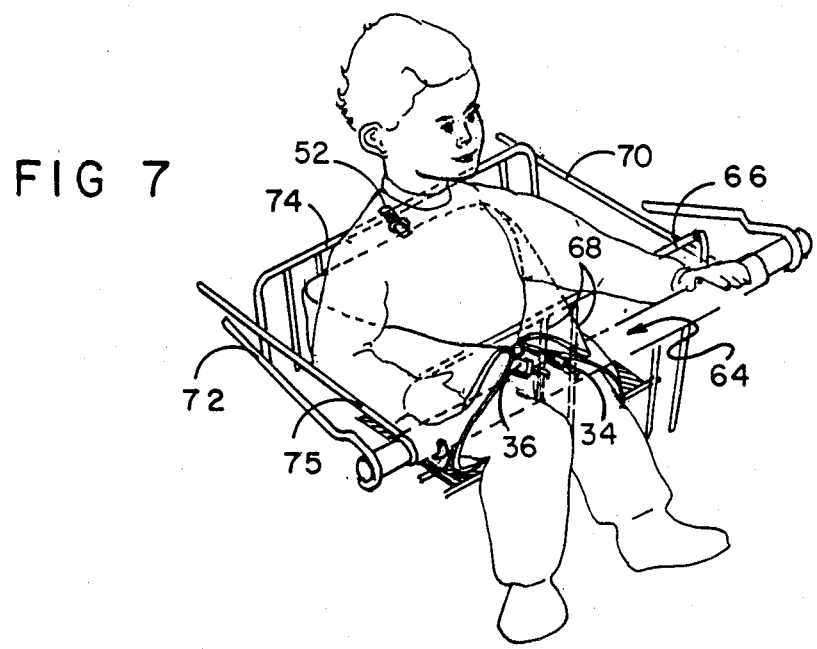
FIG. 7 illustrates the apparatus of this invention formed as a seat within a shopping cart.
Figure 8:
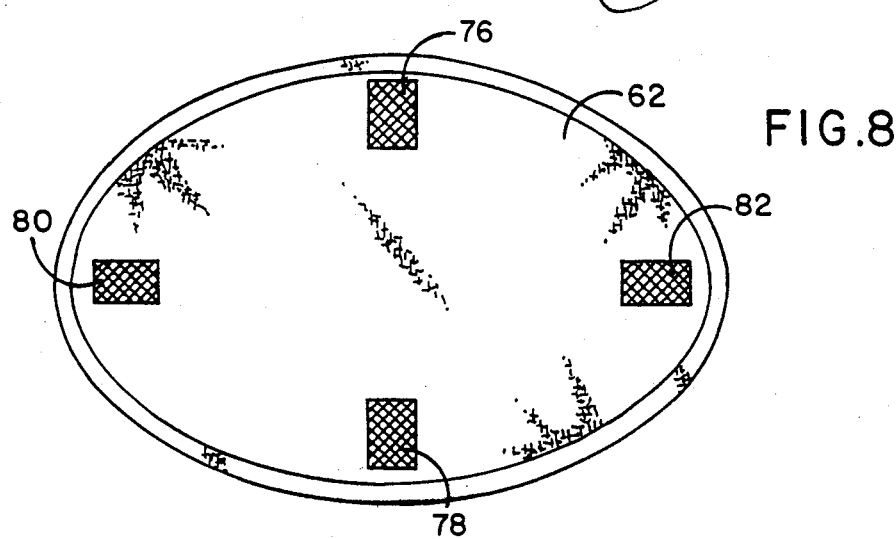
FIG. 8 illustrates the pillow member.
Figure 9:
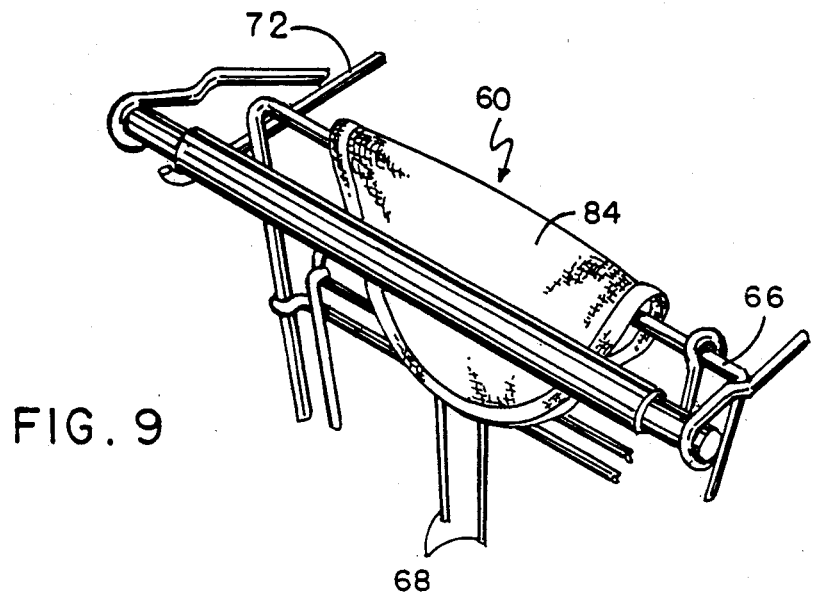
FIG. 9 illustrates the pillow member folded on its short axis around a member of the shopping cart.
Figure 10:
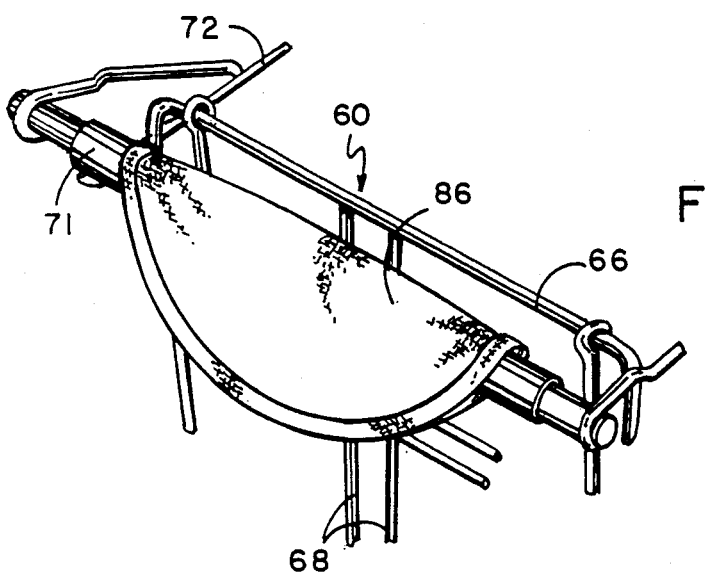
FIG. 10 illustrates the pillow member folded on its long axis.

The infant bed as herein described, when the infant grows and can sit up by himself, can be converted into a seat member. This conversion is accomplished by first inverting the entire structure causing the bed interior 32 to become the exterior by merely popping the structure inside out by pressing on the bottom of central panel 22, causing first and second inside binding 28 and 30, respectively to now be on the exterior of the unit which forms a similar cradle-shaped member. In this form as seen in FIG. 4 the first side panel can be manually flipped rearwards as shown by the direction of the arrows so that it rests against the inside face of central panel 22 which is now on the outside of the apparatus. Then first bed end 48 and second bed end 50 are manually maneuvered forward as seen in FIG. 5, and first and second end hooks 34 and 36 respectively are attached forward to the central leg separating upright metal members 68 of shopping carts 71 as seen in FIG. 7. Center hook 52 located on the seam between first side panel 24 and central panel 22 is attached rearwardly to the back 74 of the cart seat as seen in FIG. 7. This manipulation of the bed forms seat area 56 seen unoccupied in FIG. 5 (from the originally exterior portion of second side panel 26) and back portion 58 (from the originally exterior side of the bed's central panel 22) with ends 48 and 50 and the adjacent portions of central panel 22 and second side panel 26 forming sides 51 and 53 adapted to wrap snugly around the toddler to be held therein. A second set of waist retaining straps 54 are to be utilized to hold the toddler in place. Straps 54 can have quick-release buckle 59 or equivalent fastening means and can extend from seam 57 between central panel 22 and second side panel 26. Pillow 62 which is oblong in shape as seen in FIG. 8 can have a first velcro member 76 near the central portion in proximity to the side edge along its long axis and a first mating velcro portion 78 in a substantially opposite position on the opposite side edge. Likewise a second velcro member 80 can be located near one end of the narrower side of the oblong pillow, and it can have its corresponding second mating velcro portion 82 located opposite on the other narrower side.

Pillow 62 has many functions in the use of this device. When the device is used as a bed, the pillow can be inserted opened flat, with the velcro on the rear, under the child's head to be used as a pillow. As the child grows and the apparatus is converted into a seat, the pillow can be folded with the second mating velcro members 80 and 82 meeting and adhering to one another to form a semicircular shape which can be inserted with the flat side of that shape upwards as a support in front of or behind the child within the seat. Pillow 62 can also be used to prevent the child from injuring himself against front member 66 of the shopping cart by folding the pillow on its short axis 84 and joining second velcro members 80 and 82 together around the metal of the cart so that the child will not chew on the metal or hit his face thereagainst. As the child grows older and can reach further, the pillow can be utilized with its long axis 86 wrapped around the carriage handle 71 and joined at first mating velcro members 76 and 78 which arrangement can protect the child from injury should he strike the handle.

In construction second waist straps 54 can be formed in part from a continuation of one side portion of first waist strap 38 as it passes completely through the seam with the other side portion of first waist strap 38 extending through the other seam to form the strap of center hook 52. In this way the structure has greater strength compared to using separate shorter straps all individually affixed to the seams. After use, one can easily fold the apparatus, if it is in its seat mode, by reinverting it and opening it up so that the exterior is facing upward and folding the first side panel inside the second side panel or vice versa so that the apparatus forms a three-layered sandwich. Then one can fold the first end of the structure upwards, over and against the middle and fold the second end up and over the first folded portion and buckle over both folded portions with first waist strap 38 which will hold the structure together in a bundle as illustrated in FIG. 11. Before fastening the buckle of strap 38, one can insert pillow member 62 into the folded-over end members to retain the pillow for storage. In this way the device can be easily transported to and from a store and can be easily stored without taking up substantial space. Compactness of the folded device is another advantageous result of using the soft foldable cushioned material which can be easily folded for storage but yet which, when opened, has sufficient stiffness to retain and hold the particular shapes desired when using the device of this invention.

Although the present invention has been described with reference to particular embodiments, it will be apparent to those skilled in the art that variations and modifications can be substituted therefor without departing from the principles and spirit of the invention.

We claim:

1. In combination, an apparatus for supporting an infant or toddler, and a child's seat of a shopping cart, the apparatus being convertible between a cradle-like conformation useful for supporting an infant within the confines of the shopping cart child seat and a seat-like conformation useful for supporting a toddler capable of being seated within the shopping cart child seat, the child seat of the shopping cart having a substantially horizontal seat portion and a back support portion when the child seat is configured for use as a seat, the confines of the child seat further being defined by lateral side portions of the shopping cart and a rear portion of the shopping cart, comprising:

a body member which is generally oblong and concave when in the cradle-like conformation, the body member having a central portion substantially at a lower most portion thereof with sides therearound and having ends defined at the more narrow sides of said body member, the body member being adapted to be positioned in said shopping cart child seat when in the cradle-like conformation with the lower most portion of the body member being supported by the seat portion of the child seat, the body member being adapted to the seat-like conformation by folding of a lateral side portion thereof behind a central portion thereof with said ends being brought forward of the central portion to form the seat-like conformation, the shopping cart child seat supporting the folded member in the seat-like conformation.

2. The apparatus of claim 1 and further comprising means joined to the ends of the body member for releasably attaching the body member to portions of the shopping cart.

3. The apparatus of claim 1 and further comprising means joined to the ends of the body member for releasably attaching the body member to the lateral side portions of the shopping cart when the apparatus is in the cradle-like conformation.

4. The apparatus of claim 1 and further comprising means joined to the body member for releasably attaching the apparatus to the shopping cart when the body member is folded into the seat-like conformation.

5. The apparatus of claim 1 and further comprising waist retainer strap means joined to the body member for maintaining the child in a supported position relative to the apparatus.

6. The apparatus of claim 5 wherein the waist strap retainer means comprise elongated belts and fastening means joined to free ends of the elongated belts for releasably joining the free ends of the belts together, thereby to restrain and hold a child.

7. The apparatus of claim 1 and further comprising first waist retainer strap means joined to the body member at a location centrally of the body member on that surface of the body member lying within the concavity thereof when the body member is in the oblong, concave cradle-like conformation, the first waist retainer strap means being adapted to restrain and hold in place an infant disposed within the body member.

8. The apparatus of claim 7 and further comprising second waist retainer strap means joined to the body member on the that surface thereof opposite the afore said surface for restraining and holding in place a child seated on the body member when said body member is folded into the seat-like conformation.

9. The apparatus of claim 8 and further comprising means joined to the body member for releasably attaching the body member to the back support portion of the child seat.

10. The apparatus of claim 1 and further comprising an oblong pillow member having a pair of opposite short sides and a pair of opposite long sides, said pillow member including first and second pairs of releasable attachment means positioned near the outer edges thereof, said first pair of attachment means being positioned opposite one another on the long sides of said pillow member and said second pair of releasable attachment means being positioned opposite one another on the short sides, said pillow member being adapted to be positioned around the carriage handle or around a portion of the rear portion of the shopping cart or folded and used as a tummy or back support or, in its open position, used as a pillow when the apparatus is used in the cradle-like conformation.

11. The apparatus of claim 1 wherein the body member is formed of a central panel and first and second side panels of substantially eliptical shape, the panels having substantially pointed ends, the first and second side panels being joined respectively to opposite edges of the central panel to form the substantially oblong and concave body member when the body member is formed into the cradle-like conformation, the edges of the panels at the seams therebetween being turned inwardly toward that surface of the body member forming the interior surface of the body member when in the cradle-like conformation, the body member further comprising binding joining the inwardly turned panel edges together, thereby to place an outwardly directed stress on the sides of the body member to facilitate maintenance of the cradle-like conformation of said body member when the apparatus is used as a cradle.

12. The apparatus of claim 11 wherein the panels are formed of a cushioned fabric having a degree of stiffness sufficient to facilitate retaining of the shape of the body member when used in the several conformations to which said body member can be adapted.

13. The apparatus of claim 11 wherein the edges of the panels are sewn together.

14. In combination, a child support and a child seat in a shopping cart, the child support being convertible between a cradle-like conformation useful for supporting an infant within the confines of the child seat and a seat-like conformation useful for supporting a child capable of being seated within the child seat, the child seat of the shopping cart having a substantially horizontal seat portion and a back support portion when the child seat is configured for use as a seat, the confines of the child seat further being defined by lateral side portions of the shopping cart and by a rear portion of the shopping cart, the improvement comprising:

a body member including a central panel having first and second opposite edges and first and second ends, a first panel being attached to the central panel along the first edge of said central panel, a second side panel being attached along the second edge of said central panel, the body member being generally oblong and concave when in the cradle-like conformation, outer surfaces of at least the central panel contacting and being supported by the seat portion of the child seat of the shopping cart when the body member is in the cradle-like conformation;

first retainer means joined to the interior surface of the body member when in the cradle-like conformation for holding and restraining a child within the body member; and, second retainer means joined to the exterior surface of the body member when in the cradle-like conformation for holding and restraining a child when the body member is in the seat-like conformation.

15. The combination of claim 14 wherein the first retainer means comprises a first elongated strap having one end joined to the body member at the juncture between the central panel and the first panel, a second elongated strap having one end joined to the body member at the juncture between the central panel and the second panel, the first and second straps being thereby joined substantially centrally of the body member along the respective junctures of the panels.

16. The combination of claim 14 wherein the second retainer means comprise first and second elongated belts joined to the body member at the juncture between the central panel and the second panel and centrally of said juncture.

17. The combination of claim 14 wherein the improvement further comprises means joined to the body member at the ends of the central panel for releasably attaching the body member to the shopping cart.

18. The combination of claim 14 wherein the improvement further comprises means joined to the ends of the body member for releasably attaching the body member to the lateral side portions of the shopping cart when the child support is in the cradle-like conformation.

19. The combination of claim 14 wherein the improvement further comprises rear means joined to the juncture between the central panel and the first panel and centrally thereof on the same side of the body member as the second retainer means for releasably attaching the body member to the shopping cart when the child support is in the seatlike conformation.

20. The combination of claim 15 wherein the first and second retainer means comprise fastening means joined to the free ends of the straps and belts for releasably joining the respective free ends of said straps and belt together.

21. The combination of claim 14 wherein the panels are substantially eliptical in shape and have pointed ends.

22. The combination of claim 14 and further comprising an oblong pillow member having a pair of opposite short sides and a pair of opposite long sides, said pillow member including first and second pairs of releasable attachment means positioned near the outer edges of the pillow member, said first pair of attachment means being positioned opposite one another on the long sides of said pillow member and said second pair of releasable attachment means being positioned opposite one another on the short sides of said pillow member, said pillow member being adapted to be positioned around the carriage handle or around a portion of the rear portion of the shopping cart or folded and used as a tummy or back support or, in its open position, used as a pillow when the body member is in the cradle-like conformation.

23. The combination of claim 14 wherein the panels are formed of a cushioned fabric having a degree of stiffness sufficient to facilitate retaining of the shape of the body member when used in the several conformations to which the child support can be adapted.

24. The combination of claim 14 wherein the edges of the panels are sewn together.

25. The combination of claim 14 wherein the edges of the panels at seams therebetween are turned inwardly toward that surface of the body member forming the interior surface of the child support when in the cradle-like conformation, the body member comprising binding joining the inwardly turned panel edges together, thereby to place an outwardly directed stress on the sides of the body member to facilitate maintenance of the cradle-like conformation of the body member when the child support is used as a cradle.

26. A method for converting a child support adapted for use in association with a child seat in a shopping cart between a cradle-like conformation useful for supporting an infant within the confines of the child seat and a seat-like conformation useful for supporting a child capable of being seated within the child seat, the child seat of the shopping cart having a substantially horizontal seat portion and a back support portion when the child seat is configured for use as a seat, the confines of the child seat further being defined by lateral side portions of the shopping cart and a rear portion of the shopping cart, the child support including a body member which is generally oblong and concave when in the cradle-like conformation, the body member having a central portion substantially at the bottom thereof with first and second side portions therearound and having ends defined at the more narrow sides thereof, the child support being adapted to be positioned in the child seat when in the cradle-like conformation, with the bottom of the body member being supported by the seat portion of the child seat, the method comprising the steps of:

inverting the body member to cause the interior surface of the body member when in the cradle-like conformation to become the exterior surface;

folding the first side portion of the body member rearwardly behind the central portion;

positioning the second side portion of the body member on the seat portion of the shopping cart child seat;

positioning the central portion of the body member on the back support portion of the shopping cart child seat; and, drawing the ends of the body member inwardly and releasably attaching said ends to the rear portion of the shopping cart to form a seat-like conformation within which a child capable of sitting can be disposed.

27. The method of claim 26 and further comprising the step of releasably attaching the central portion of the body member to the back support portion of the shopping cart.

28. The method of claim 26 and further comprising the step of restraining the child within the child support.

* * * * *